(12) United States Patent
Park

(10) Patent No.: US 11,875,705 B1
(45) Date of Patent: Jan. 16, 2024

(54) APPARATUS AND METHOD FOR SUPPORTING EQUIPMENT MANUFACTURING PROCESS

(71) Applicants: HYUNDAI MOBIS CO., LTD., Seoul (KR); Auburn University, Auburn, AL (US)

(72) Inventor: Jong Min Park, Yongin-si (KR)

(73) Assignees: HYUNDAI MOBIS CO., LTD., Seoul (KR); AUBURN UNIVERSITY, Auburn, AL (US)

( * ) Notice: Subject to any disclaimer, the term of this patent is extended or adjusted under 35 U.S.C. 154(b) by 0 days.

(21) Appl. No.: 17/991,890

(22) Filed: Nov. 22, 2022

(51) Int. Cl.
*G09B 19/24* (2006.01)
*G09B 5/02* (2006.01)
*G06F 3/04815* (2022.01)
*G06F 3/04842* (2022.01)

(52) U.S. Cl.
CPC ............ *G09B 5/02* (2013.01); *G06F 3/04815* (2013.01); *G09B 19/24* (2013.01); *G06F 3/04842* (2013.01)

(58) Field of Classification Search
CPC ........ G09B 19/24; G09B 19/003; G09B 9/00; G09B 7/00; G09B 5/00; G06T 19/006
See application file for complete search history.

(56) References Cited

U.S. PATENT DOCUMENTS

| | | | |
|---|---|---|---|
| 11,200,811 B2 * | 12/2021 | Kwatra | G09B 19/24 |
| 2014/0263224 A1 | 9/2014 | Becker | |
| 2014/0272835 A1 * | 9/2014 | Becker | G09B 9/00 434/234 |
| 2014/0272837 A1 | 9/2014 | Becker | |
| 2015/0243013 A1 * | 8/2015 | White | G06F 3/0304 382/103 |
| 2020/0125846 A1 * | 4/2020 | Laughlin | B29C 70/30 |
| 2022/0084426 A1 * | 3/2022 | Grube | G09B 5/065 |

FOREIGN PATENT DOCUMENTS

WO WO-2017122274 A1 * 7/2017 ......... G06K 9/00671

* cited by examiner

*Primary Examiner* — Robert J Utama
(74) *Attorney, Agent, or Firm* — NovoTechIP International PLLC

(57) ABSTRACT

Provided is an apparatus for supporting an equipment manufacturing process, the apparatus including: a display; and a processor providing a user with a graphical user interface (GUI) for supporting a target-equipment manufacturing process of the user in the form of mixed reality (MR) through the display, and supporting an interaction operation between the GUI and a user action.

20 Claims, 8 Drawing Sheets

– Login –

– Register –

– Station Operation –

– Safety Video & Instruction –

– Hologram Operation Manual –

– Basic training –

– Basic Connector –

– Selection –

– Production –

APPARATUS AND METHOD FOR SUPPORTING EQUIPMENT MANUFACTURING PROCESS

TECHNICAL FIELD

Embodiments of the disclosure relate to apparatus and method for supporting an equipment manufacturing process.

BACKGROUND

In case that a new vehicle is developed, it may be essential to conduct training of a worker on a manufacturing process of a part applied to the developed new vehicle, and the training on the manufacturing process of the part applied to the developed new vehicle may be conducted in such a manner that a trainer explains an audiovisual material such as a video or an image to a trainee offline. However, in consideration of a large number of parts applied to the vehicle and resulting complexity of the process, the above-mentioned offline training method may have a lower efficiency and the trainee's reduced concentration on the training. In particular, the training efficiency may be further reduced in case of training on a manufacturing process requiring the large number of parts to be assembled to each other, such as a module applied to the vehicle.

In addition, the trainee may need to move to a promised training site for the offline training, and it may thus be inefficient in that the trainee consumes time and cost and has accumulated physical fatigue. The above time and cost consumption and physical fatigue may be further aggravated in case that a trainee belonging to a branch office located in a specific country has to move to a head office located in another country for the training.

SUMMARY

Various embodiments are directed to apparatus and method for supporting an equipment manufacturing process, which may reduce training inefficiency caused by offline training on a manufacturing process of target equipment (e.g., a module applied to a new vehicle) and a trainee's time and cost consumption and physical fatigue caused by the offline training.

In an embodiment, an apparatus for supporting an equipment manufacturing process includes: a display; and a processor providing a user with a graphical user interface (GUI) for supporting a target-equipment manufacturing process of the user in the form of mixed reality (MR) through the display, and supporting an interaction operation between the GUI and a user action.

The GUI may include a training GUI for supporting training of the user on the target-equipment manufacturing process.

The training GUI may include a virtual object for a target equipment.

The training GUI may include first to Nth sub-training GUIs.

The virtual object may include a virtual equipment object in which the target equipment is modeled in three dimensions and a virtual tool object in which a tool required for manufacturing the target equipment is modeled in the three dimensions, and the first sub-training GUI may include the virtual equipment object and the virtual tool object.

The processor may support an interaction operation between the first sub-training GUI and the user action in such a manner that the user virtually grips the virtual tool object to virtually manufacture the virtual equipment object.

A virtual manufacturing process of the virtual equipment object may include a plurality of steps, and the processor may switch the virtual manufacturing process to a next step only in case that a virtual manufacturing result of the user in a current step matches a predefined manufacturing reference.

The first sub-training GUI may further include a user interface for describing the target-equipment manufacturing process.

The user interface may include an interface associated with a work standard to be observed during the target-equipment manufacturing process, information on identification (ID) of the target equipment, information on the tool required for manufacturing the target equipment and information on a manufacturing quality of the target equipment.

The second to Nth sub-training GUIs may include at least one of an interface for an operation manual of the GUI provided in the form of mixed reality, an interface for a safety requirement to be observed during the target-equipment manufacturing process, or an interface for a basic training material for the target-equipment manufacturing process.

The first to Nth sub-training GUIs may be switched to one another based on the user action.

The GUI may further include a production GUI for supporting an on-site manufacturing operation of the user for the target-equipment manufacturing process.

Any one of the training GUI and the production GUI may be selected by the user action.

The production GUI may include at least one of an interface for a training material for the on-site manufacturing operation of the user, an interface for a work instruction for the on-site manufacturing operation of the user, or an interface for a code reader for checking specifications of the target equipment of the on-site manufacturing operation.

The target equipment to be applied to the training GUI or production GUI for supporting the training or on-site manufacturing operation of the user may be selected from equipment provided through the GUI by the user action.

The apparatus may be implemented as a head mounted display (HMD) worn by the user.

The processor may obtain data for providing the GUI from a computer-readable medium (e.g., memory) stored in the HMD or an external server.

The target equipment may be a module applied to a vehicle, and the manufacturing process may be an assembly process of the module.

In another embodiment, a method for supporting an equipment manufacturing process includes: providing, by a processor, a GUI for supporting a target-equipment manufacturing process of a user; providing, by the processor, the user with the provided GUI in the form of mixed reality (MR) through a display; and supporting, by the processor, an interaction operation between the GUI and a user action.

In still another embodiment, an apparatus for supporting an equipment manufacturing process includes: a memory (or other computer-readable medium); and a processor operatively coupled to the memory, providing a GUI for supporting the training or on-site manufacturing operation of a user for a target-equipment manufacturing process by referring to data stored in the memory, providing the user with the provided GUI in the form of mixed reality (MR), and supporting an interaction operation between the GUI and a user action.

In accordance with the embodiments of the disclosure, it is possible to provide the trainee with the GUI for supporting the training of the user on the target-equipment manufacturing process in the form of mixed reality (MR), and support the interaction operation between the GUI and the user action, thereby reducing the trainee's time and cost consumption and physical fatigue caused by his/her physical movement and the training inefficiency caused by the prior offline training. Furthermore, it is possible to apply the above training method to the trainee's on-site operation process, thereby improving the productivity and the efficiency in the actual target-equipment manufacturing process.

DETAILED DESCRIPTION

Hereinafter, apparatus and method for supporting an equipment manufacturing process will be described below with reference to the accompanying drawings through various embodiments. It should be noted that the drawings may be exaggerated in thickness of lines or sizes of components for clarity and convenience of explanation. Furthermore, terms used herein are defined by taking functions in the disclosure into account and may be changed according to practice or the intention of users or operators. Therefore, definition of the terms should be made based on the contents throughout the specification.

In this embodiment, disclosed is an apparatus which may support a training of a user on a target-equipment manufacturing process or an actual on-site manufacturing operation. Here, there is no particular limitation on a target equipment and, only to assist in the understanding of this embodiment, it is described that the target equipment corresponds to a module applied to a vehicle (e.g., developed new car), and the manufacturing process corresponds to a process of assembling respective parts included in the module to each other.

Figure 1:
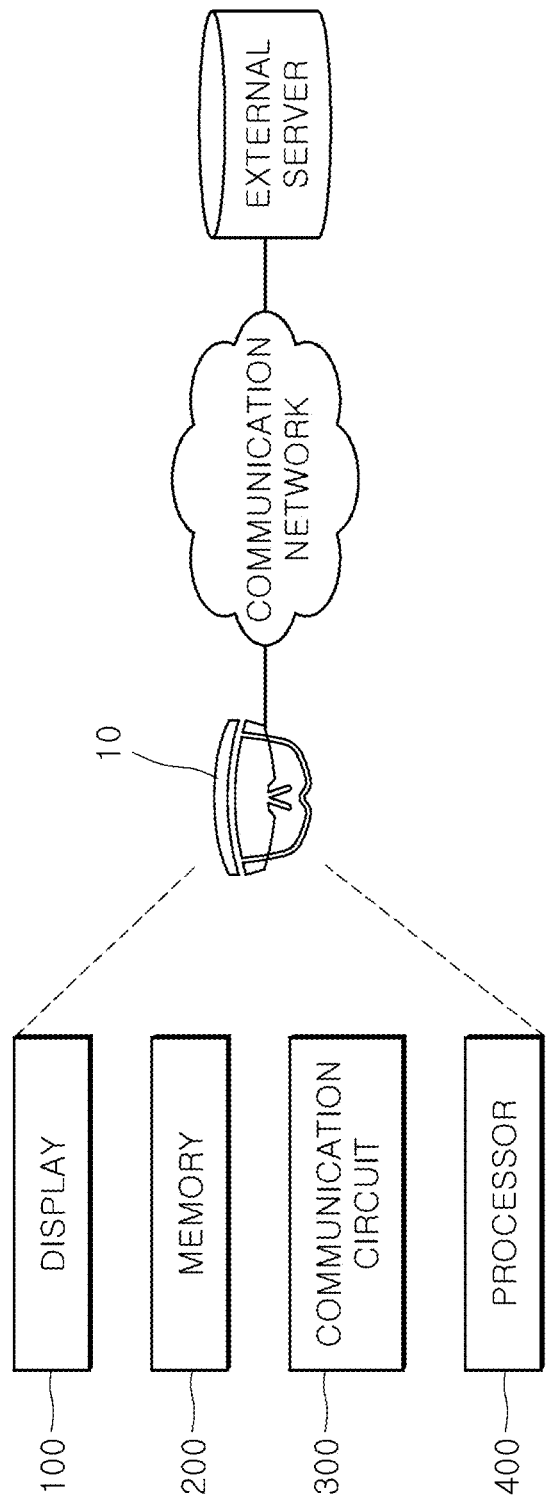
FIG. 1 is a block diagram showing an apparatus for supporting an equipment manufacturing process according to an embodiment.
Figure 2:
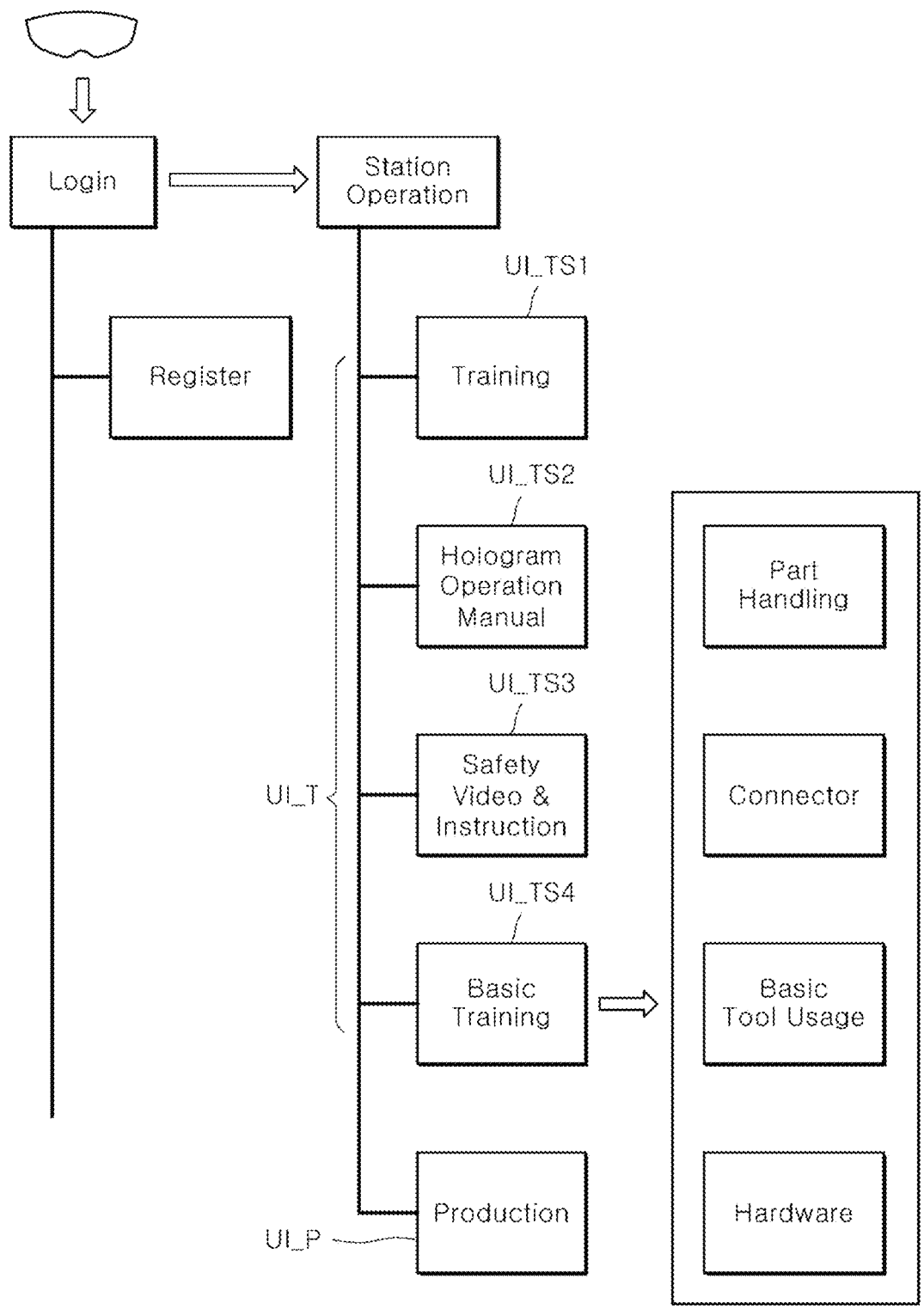
FIGS. 2 and 3 are exemplary diagrams each showing a structure of a graphical user interface (GUI) in the apparatus for supporting an equipment manufacturing process according to an embodiment.
Figure 3:
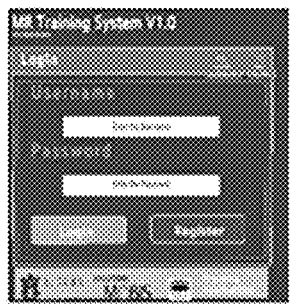
Figure 3:
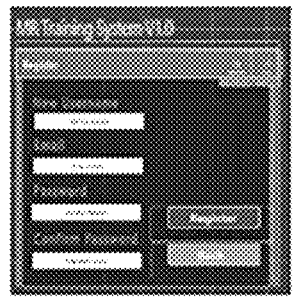
Figure 3:
Figure 3:
Figure 3:
Figure 3:
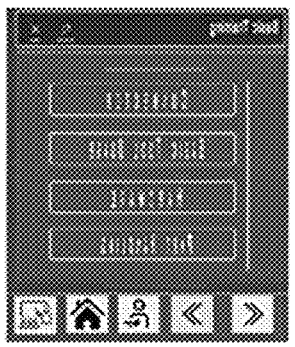
Figure 3:
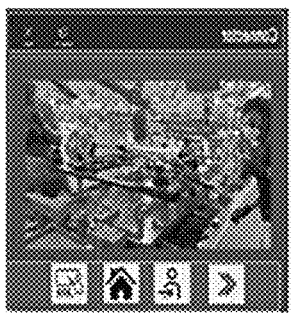
Figure 3:
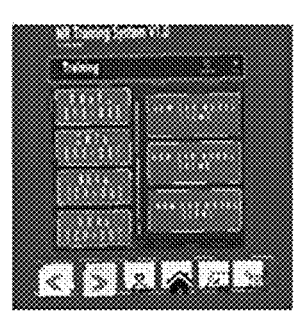
Figure 3:
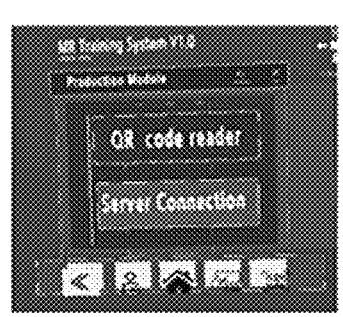
Figure 4:
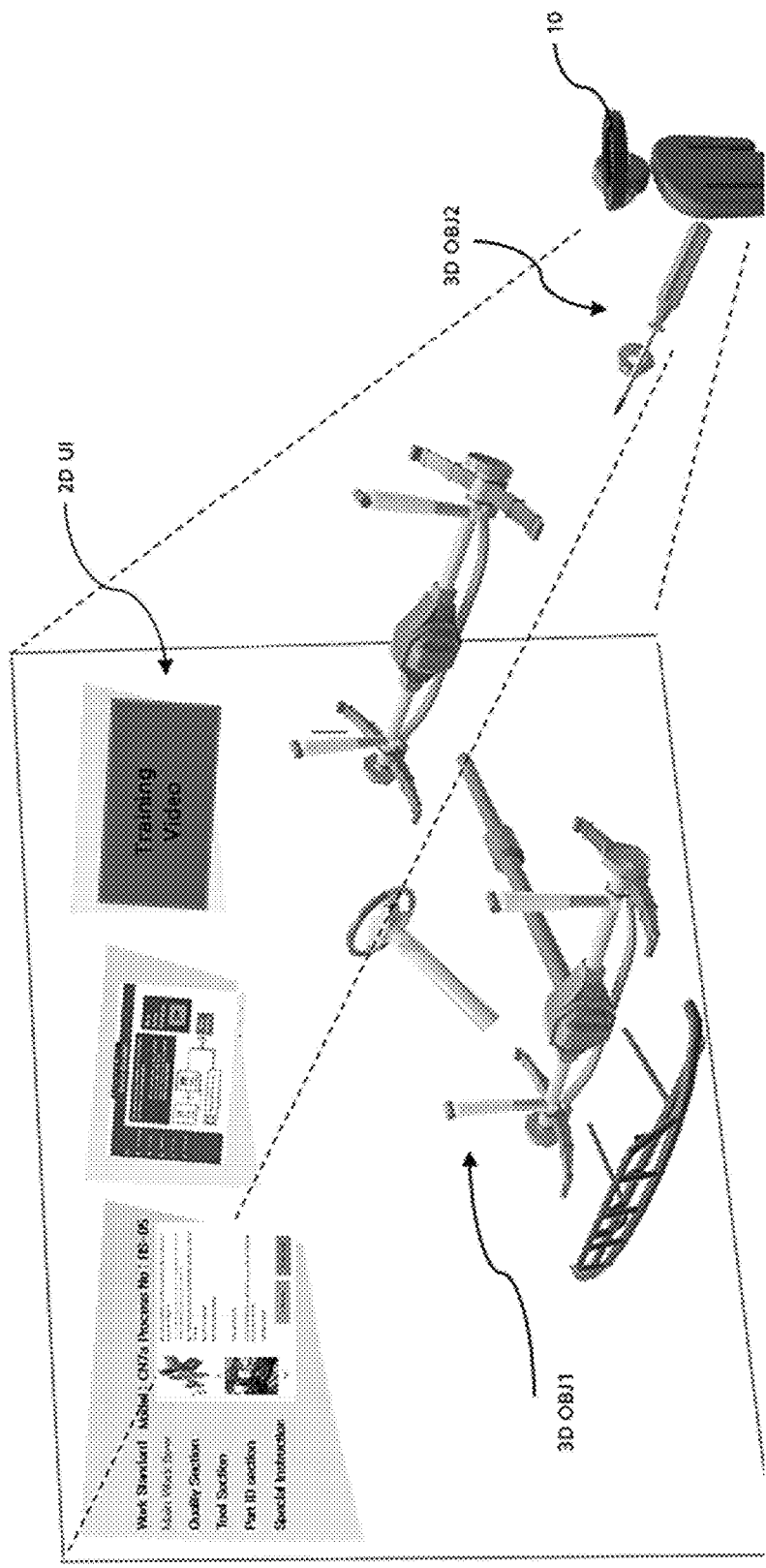
FIGS. 4 to 6 are exemplary diagrams each showing a first sub-training GUI in the apparatus for supporting an equipment manufacturing process according to an embodiment.
Figure 5:
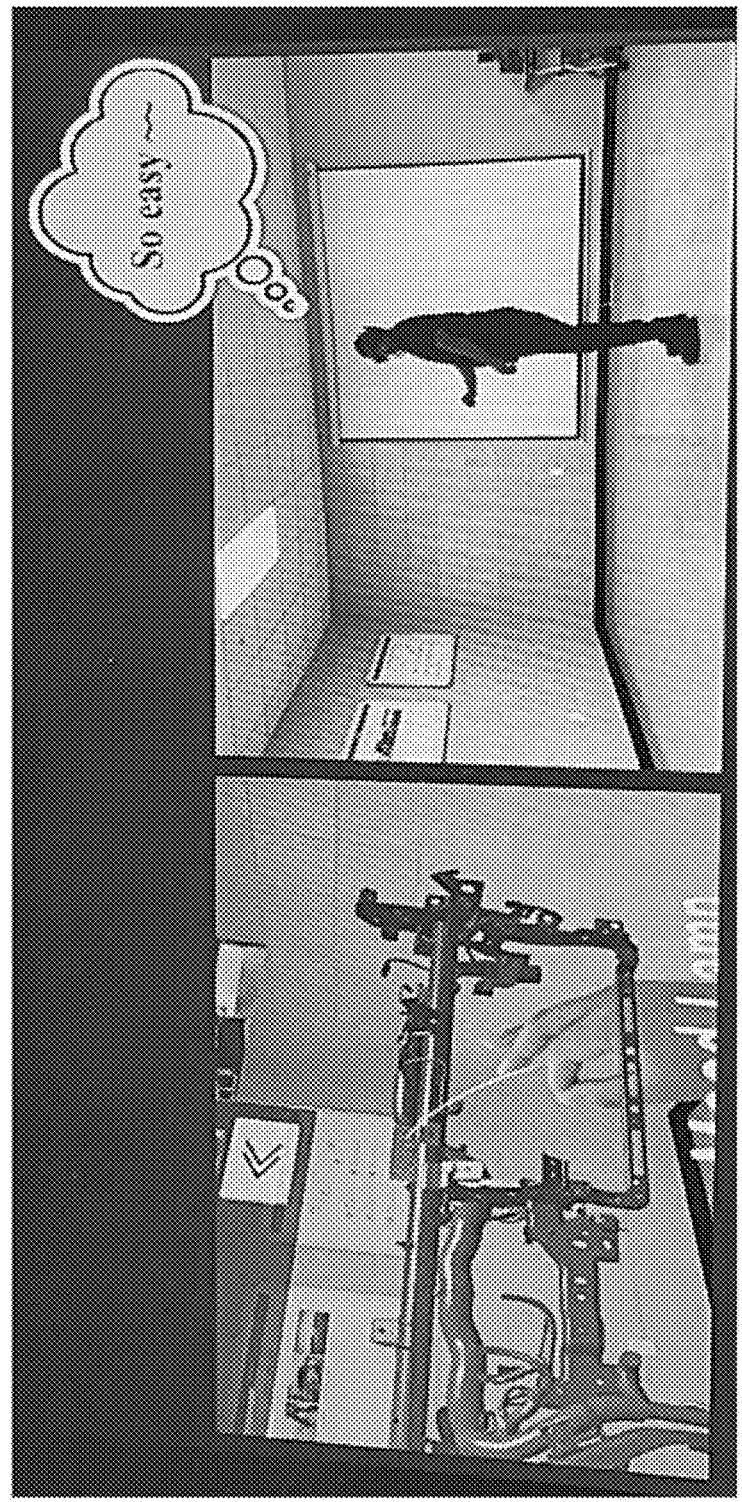
Figure 6:
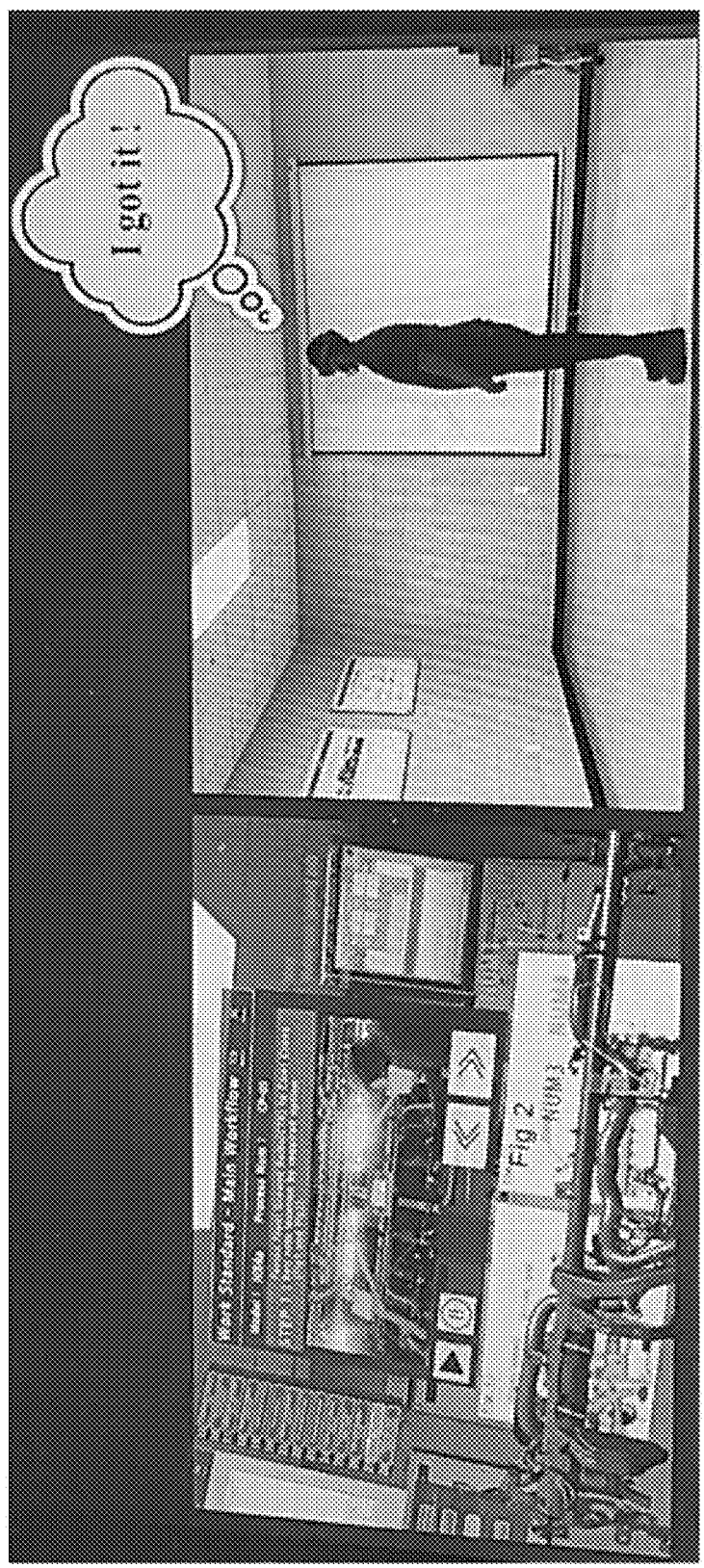
Figure 7:
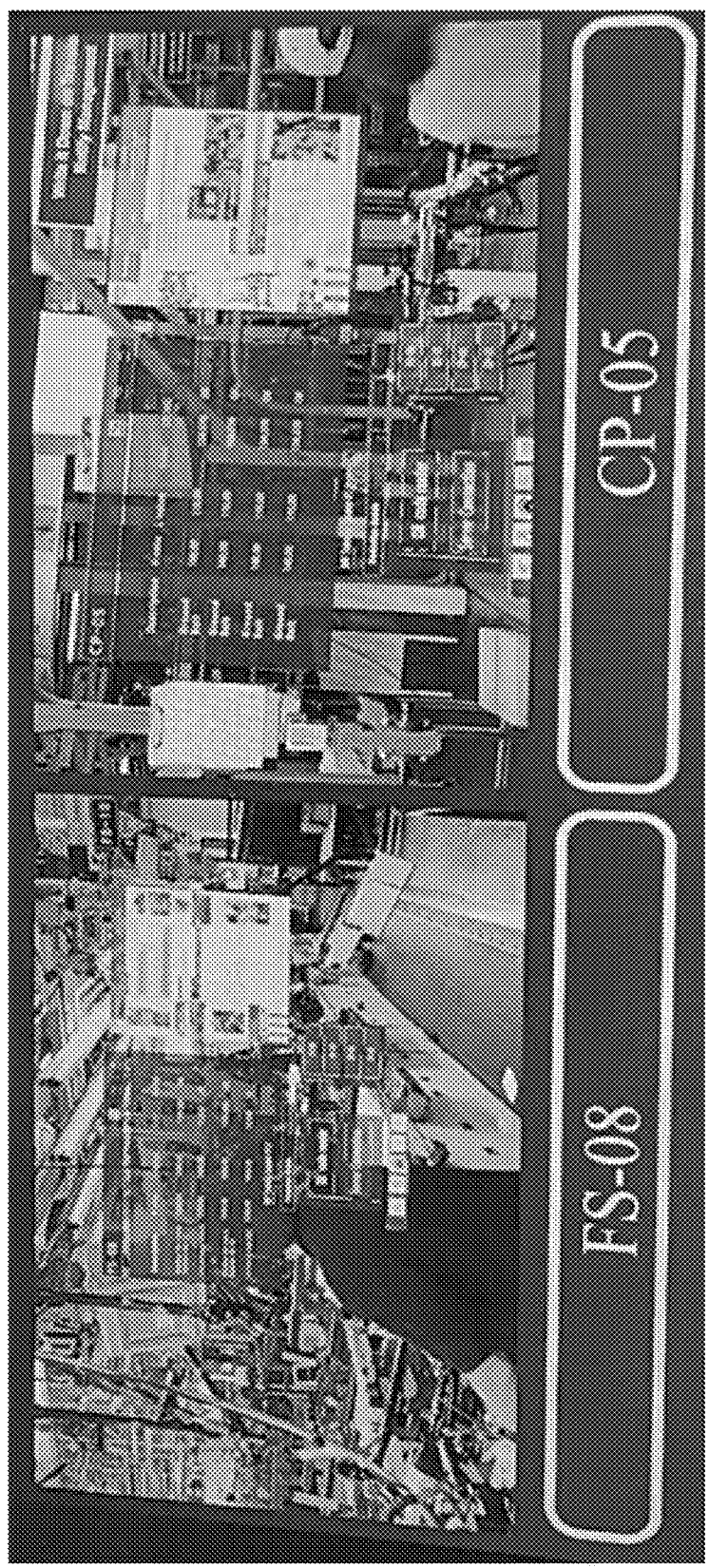
FIG. 7 is an exemplary diagram showing a production GUI in the apparatus for supporting an equipment manufacturing process according to an embodiment.

FIG. 1 is a block diagram showing an apparatus for supporting an equipment manufacturing process according to an embodiment; FIGS. 2 and 3 are exemplary diagrams each showing a structure of a graphical user interface (GUI) in the apparatus for supporting an equipment manufacturing process according to an embodiment; FIGS. 4 to 6 are exemplary diagrams each showing a first sub-training GUI in the apparatus for supporting an equipment manufacturing process according to an embodiment; and FIG. 7 is an exemplary diagram showing a production GUI in the apparatus for supporting an equipment manufacturing process according to an embodiment.

Referring to FIG. 1, the apparatus for supporting an equipment manufacturing process (hereinafter, an apparatus 10) according to this embodiment may include a display 100, a memory 200, a communication circuit 300 and a processor 400. The apparatus 10 including the above components 100, 200, 300 and 400 may be implemented as a head mounted display (HMD) worn on the user's head, and perform wireless communication with an external server storing data required to provide a GUI to be described below through the communication circuit 300.

The display 100 may correspond to a channel through which the GUI to be described below is output, and may be provided in an area on the HMD, corresponding to positions of eyes of the user (i.e., trainee). The display 100 may be implemented as a binocular-type display device to output a three-dimensional (3D) virtual object to be described below, and may be implemented as a transparent display device for the three-dimensional virtual object to be superimposed on a real world and then output. Meanwhile, although not shown in FIG. 1, the HMD in which the apparatus 10 is implemented may include a speaker provided in an area adjacent to the user's ears to provide auditory information.

The memory 200 may be implemented as a storage such as a random access memory (RAM), a read only memory (ROM) or a flash memory, and may store various data required to provide the GUI. The data may include data on a 3D drawing of the equipment and data on a 3D drawing of a tool, which are the basis for providing the virtual object to be described below, data on a work standard (e.g., text data of a work standard to be observed during the manufacturing process), data on identification information of the equipment (e.g., ID data of a module), data on a tool required for manufacturing the target equipment (e.g., data on types of tools used for each step of the manufacturing process), data on a manufacturing quality of the target equipment (e.g., data on an instruction for achieving a target manufacturing quality), data on an operation manual of the GUI (e.g., data on how to use the GUI), data (or audio-visual video data) on a safety requirement to be observed during the target-equipment manufacturing process, data on a basic training material for the target-equipment manufacturing process (e.g., data on how to handle a part, data on how to connect the parts to each other, data on how to use a tool used to handle the part, hardware data or the like), data on a work instruction used at an actual work site, and reference code data serving as a reference for checking specifications of the target equipment of an on-site manufacturing work. The above data may be all stored in the memory 200, or shared and stored in the memory 200 and the external server in consideration of capacity of the memory 200.

The communication circuit 300 may function as a circuit for the wireless communication between the HMD in which the apparatus 10 is implemented and the external server, and may be implemented as a short-range wireless communication IC chip such as wireless fidelity (Wi-Fi), Bluetooth (BT), near field communication (NFC) or Zigbee, or a long-range wireless communication IC chip such as low power wide area (LPWA) and long range (LoRa).

The processor 400 may be a dedicated processor (e.g., embedded processor) for performing an operation to be described below, or a general-purpose processor (e.g., central processing unit (CPU) or application processor) capable of performing an operation by executing one or more software programs stored in the memory 200, and may also include a graphic processing unit (GPU) to perform a graphic processing focused in this embodiment.

Based on the above description, the following description describes an operation of the apparatus 10 in detail by focusing on an operation of the processor 400.

In this embodiment, the processor 400 may provide the user with the GUI for supporting the target-equipment manufacturing process of the user (i.e., trainee) in the form of mixed reality (MR) through the display 100. The processor 400 may provide the user with the GUI in the form of mixed reality and support an interaction operation between the GUI and a user action by providing virtual reality (VR) including the virtual object (to which virtual equipment object, virtual tool object and hologram technology may be applied) and providing augmented reality (AR) superimposing these virtual objects on the real world.

FIG. 2 shows an example of the structure of the GUI. The GUI may include an interface for user login ('Login'), an interface for user registration ('Register'), and a main interface ('Station Operation') initially displayed after the login. The following icons may be displayed on the main interface: an icon for entering an interface (defined as a training GUI UI_T) that supports the training of the user on the target-equipment manufacturing process; and an icon for entering an interface (defined as a production GUI UI P) that supports an on-site manufacturing operation of the user for the target-equipment manufacturing process.

As shown in FIG. 2, the training GUI UI_T may include a plurality of sub-training GUI (e.g., first to Nth sub-training GUIs), and FIG. 2 shows an example in which "N" is four (4), and first to fourth sub-training GUIs UI_TS1, UI_TS2, UI_TS3 and UI_TS4 are provided. The first sub-training GUI UI_TS1 ('Training') may correspond to an interface that simulates the actual on-site manufacturing operation and allows the user to experience a virtual on-site manufacturing operation; the second sub-training GUI UI_TS2 ('Hologram Operation Manual') may correspond to an interface that provides an operation manual (i.e., hologram user manual) of the GUI provided in the form of mixed reality; the third sub-training GUI UI_TS3 ('Safety Video & Instruction') may correspond to an interface that provides a video and an instruction, related to the safety requirement to be observed during the target-equipment manufacturing process; and the fourth sub-training GUI UI_TS4 ('Basic Training') may correspond to an interface that provides the basic training material for the target-equipment manufacturing process. Content provided through each sub-training GUI may be stored in the above-mentioned memory 200, and the processor 400 may graphically process the data stored in the memory 200 to provide each sub-training GUI and then output the same through the display 100. The first to Nth sub-training GUIs may be switched to one another based on the user action. Among the examples of the interfaces employed in this embodiment, FIG. 3 shows another example as follows: an interface for user login ('Login'), an interface for user registration ('Register'), a main interface ('Station Operation'), a second sub-training GUI ('Hologram Operation Manual'), a third sub-training GUI ('Safety Video & Instruction'), a fourth sub-training GUI ('Basic Training' or 'Basic Connector'), an equipment selection interface ('Selection', to be described below) and a production GUI ('Production', to be described below).

The first sub-training GUI among the above-mentioned interfaces is described in detail with reference to FIGS. 4 to 6.

As shown in FIG. 4, the first sub-training GUI may include (and provide) the 3D virtual object for the target equipment, and the virtual object may include a virtual equipment object 3D OBJ1 in which the target equipment is modeled in three dimensions and a virtual tool object 3D OBJ2 in which the tool required for manufacturing the target equipment is modeled in the three dimensions. The virtual equipment object and the virtual tool object may serve to allow the user to experience the virtual on-site manufacturing operation.

In detail, as shown in FIG. 5, the processor 400 may support an interaction operation between the first sub-training GUI and the user action in such a manner that the user virtually grips the virtual tool object to virtually manufacture the virtual equipment object (here, a sensor for supporting the interaction operation (e.g., a gyro sensor for identifying the user's head motion or an image sensor for identifying the user's hand) and a sensor value-based GUI control algorithm may be predefined in the processor 400). A virtual manufacturing process of the virtual equipment object may include a plurality of steps. In this case, the processor 400 may support the above-described interaction operation by switching the virtual manufacturing process to a next step only in case that a virtual manufacturing result of the user in a current step matches a predefined manufacturing reference. For example, a first step may correspond to a process of assembling a first part and a second part to each other via a bolt and a nut (corresponding to the tool), and the manufacturing reference in the first step may be defined as the assembly of the first part and the second part in such a manner that the bolt and the nut are fastened to each other in a first position of the first part and a second position of the second part. Here, the processor 400 may not switch the current step to the next step, i.e., second step, in case that the user intends to fasten the bolt and the nut to each other in another position (different from the first position) of the first part and another position (different from the second position) of the second part.

Meanwhile, as shown in FIG. 4, the first sub-training GUI may include a two-dimensional (2D) user interface 2D UI that describes the target-equipment manufacturing process, and the 2D user interface may include an interface associated with a work standard to be observed during the target-equipment manufacturing process, information on identification (ID) of the target equipment, information on the tool required for manufacturing the target equipment and information on the manufacturing quality of the target equipment. FIG. 6 shows an example in which the 2D user interface is provided through the first sub-training GUI together with the virtual equipment object. Here, the user may perform the training by referring to the information provided through the 2D user interface and experiencing the virtual on-site manufacturing operation based on the virtual equipment object and the virtual tool object. It is thus possible to improve training efficiency.

The GUI employed in this embodiment may further include the production GUI for supporting the on-site manufacturing operation of the user for the target-equipment manufacturing process, together with the training GUI described above, and any one of the training GUI and the production GUI may be selected by the user action.

The production GUI may include at least one of an interface for a training material for the on-site manufacturing operation of the user, an interface for a work instruction for the on-site manufacturing operation of the user, or an interface for a code reader (e.g., barcode reader or QR code reader) for checking specifications of the target equipment of the on-site manufacturing operation. FIG. 7 shows an example in which the production GUI is output through the display 100. Accordingly, the user may easily check the training material and the work instruction on a corresponding work during the actual on-site manufacturing work, and also may check the code through the display 100 without having to turn his/her head to a separate monitor outputting the code for checking the specifications of the equipment as in the prior art. It is thus possible to improve efficiency of the on-site manufacturing operation.

Meanwhile, the target equipment to be applied to the training GUI or production GUI for supporting the training or on-site manufacturing operation of the user may be selected from equipment provided through the GUI (i.e., equipment selection interface ('Selection') of FIG. 3) by the user action. For example, the processor 400 may provide the plurality of modules (e.g., cockpit module, rear chassis module, front chassis module and the like) applied to the vehicle through the GUI. In case that any one module is selected by the user action, the processor 400 may provide the training GUI or production GUI corresponding to the selected module, output the same through the display 100, and then provide the user with the output GUI (e.g., the left diagram of FIG. 7 shows the production GUI in case that process 8 of the front chassis module is selected, and the right diagram of FIG. 7 shows the production GUI in case that process 5 of the cockpit module is selected).

Figure 8:
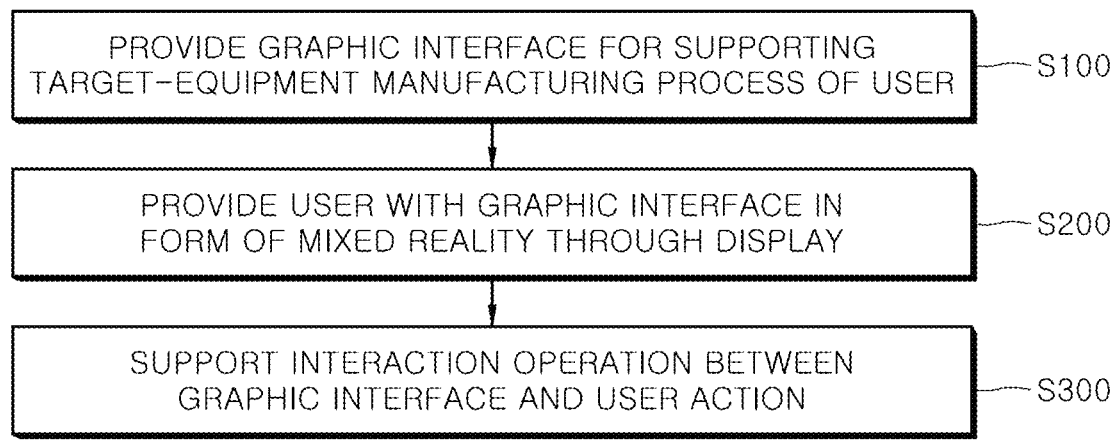
FIG. 8 is a flowchart showing a method for supporting an equipment manufacturing process according to another embodiment.

FIG. 8 is a flowchart showing a method for supporting an equipment manufacturing process according to another embodiment. Referring to FIG. 8, the method for supporting an equipment manufacturing process according to another embodiment may include: providing, by a processor 400, a GUI for supporting a target-equipment manufacturing process of a user (S100); providing, by the processor 400, the user with the provided GUI in the step S100 in the form of mixed reality (MR) through a display 100 (S200); and supporting, by the processor 400, an interaction operation between the GUI and a user action (S300). The specific operation of the processor 400 in each step may be the same as described above.

As set forth above, in accordance with the embodiments, it is possible to provide the trainee with the GUI for supporting the training of the user on the target-equipment manufacturing process in the form of mixed reality (MR), and support the interaction operation between the GUI and the user action, thereby reducing the trainee's time and cost consumption and physical fatigue caused by his/her physical movement and the training inefficiency caused by the prior offline training. Furthermore, it is possible to apply the above training method to the trainee's on-site operation process, thereby improving the productivity and the efficiency in the actual target-equipment manufacturing process.

The implementations described herein may be implemented in, for example, a method or process, an apparatus, a software program, a data stream or a signal. Although disclosed only in a single form of implementation (e.g., disclosed only as a method), the implementation of the disclosed feature may also be implemented in another form (e.g., as an apparatus or program). The apparatus may be implemented in suitable hardware, software, firmware or the like. For example, the method may be implemented in an apparatus such as a processor which generally refers to a computer, a micro-processor, a processing device including an integrated circuit, a programmable logic device or the like. The processor may also include a communication device such as a computer, a mobile phone, a portable/personal digital assistant ("PDA") or another device that facilitates communication of information between end-users.

Although the embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for supporting an equipment manufacturing process, the apparatus having a training mode and a production mode, the apparatus comprising:
a display for supporting a Virtual Reality (VR) environment in the training mode and an Augmented Reality (AR) environment in the production mode, wherein an AR interface of the production mode is configured for a production environment in which a user repeatedly completes a target equipment manufacturing process to produce target equipment using techniques trained in the VR environment of the training mode;
a processor for selectively implementing the VR environment in the training mode and the AR environment in the production mode; and
a computer-readable medium comprising instructions that, when executed by the processor, cause the processor to control the apparatus to perform:
generating a graphical user interface (GUI) configured to allow a user to select between the training mode and the production mode for a target equipment manufacturing process;
causing the display to display the GUI;
supporting an interaction between the GUI and the user; and
providing access, through the GUI from either the training mode or production mode, to a set of instructional training materials for the target equipment manufacturing process.

2. The apparatus of claim 1, wherein, in the training mode, the GUI includes a training GUI that includes, in the VR environment, a virtual equipment object and a virtual tool object to allow the user to train on performing the target equipment manufacturing process by using the virtual tool object on the virtual equipment object.

3. The apparatus of claim 2, wherein the training GUI includes a virtual two-dimensional user interface to the instructional training materials for instructional guidance for performing the target equipment manufacturing process, the two-dimensional user interface displayed along with the virtual equipment object and virtual tool object.

4. The apparatus of claim 3, wherein the training GUI includes a training video accessible in the two-dimensional user interface.

5. The apparatus of claim 1, wherein:
the VR environment of the training mode comprises (1) a virtual equipment object three-dimensionally modelling a workpiece of the target equipment manufacturing process and (2) a virtual tool object three-dimensionally modelling a tool required for the manufacturing process on the target equipment, the VR environment further comprising access to the set of instructional training materials to guide the user in a virtual execution of the equipment manufacturing process; and
the AR environment of the production mode is used when the user is actually performing the target equipment manufacturing process and includes the access to the set of instructional training materials to guide the user in actually performing the equipment manufacturing process.

6. The apparatus of claim 5, wherein, for supporting the interaction between the GUI and the user, the instructions, when executed by the processor, further cause the processor to control the apparatus to perform allowing the user to virtually grip the virtual tool object to virtually manufacture the virtual equipment object.

7. The apparatus of claim 6, wherein:
the virtual equipment object is used for a virtual manufacturing process involving a first step and a second step subsequent to the first step, and
the instructions, when executed by the processor, further cause the processor to control the apparatus to perform switching the virtual manufacturing process from the first step to the second step when a virtual manufacturing result of the user in the first step matches a predefined manufacturing reference.

8. The apparatus of claim 5, wherein the GUI is configured to provide, within the instructional training materials, all of: a description of the target equipment manufacturing process, data on a work instruction used at an actual work site, and reference code data serving as reference for checking specifications of target equipment at the actual work site.

9. The apparatus of claim 8, wherein the description includes at least one of:
information on a safety requirement to be observed during the target equipment manufacturing process; and
information on a manufacturing quality of the target equipment.

10. The apparatus of claim 1, wherein, as part of the instructional training materials, the GUI includes:
a sub-training GUI configured to describe a safety requirement to be observed during the target equipment manufacturing process; and
a sub-training GUI configured to provide a basic training material for the target equipment manufacturing process.

11. The apparatus of claim 10, wherein the instructions, when executed by the processor, further cause the processor to control the apparatus to perform allowing the user to switch from one of the plurality of sub-training GUIs to another.

12. The apparatus of claim 1, wherein the GUI further includes a production GUI configured to support the user to perform an actual on-site manufacturing operation for the target equipment manufacturing process in the AR environment, where the user has the access to the instructional training materials while viewing real target equipment for actually performing the target equipment manufacturing process.

13. The apparatus of claim 12, wherein the instructions, when executed by the processor, further cause the processor to control the apparatus to perform allowing the user to select any one of the training GUI and the production GUI.

14. The apparatus of claim 12, wherein the production GUI is configured to provide:
a code reader for checking specifications of the target equipment of the on-site manufacturing operation.

15. The apparatus of claim 12, wherein the instructions, when executed by the processor, further cause the processor to control the apparatus to perform allowing the user to select the target equipment for the training GUI or production GUI.

16. The apparatus of claim 1, wherein the apparatus comprises a head mounted display (HMD) configured such to allow the user to check code for specifications of target equipment for the target equipment manufacturing process in the GUI within the HMD without having to turn to refer to another monitor.

17. The apparatus of claim 1, wherein target equipment of the manufacturing process comprises multiple pieces and the manufacturing process comprises assembling the multiple pieces of the target equipment to each other.

18. The apparatus of claim 1, wherein:
target equipment of the manufacturing process comprises a module for a vehicle, and
the target equipment manufacturing process includes an assembly process of the module.

19. A method for supporting an equipment manufacturing process with an apparatus having a training mode and a production mode, the apparatus comprising:
a display for supporting a Virtual Reality (VR) environment in the training mode and an Augmented Reality (AR) environment in the production mode; and
a processor for selectively implementing the VR environment in the training mode and the AR environment in the production mode;
the method comprising:
generating a graphical user interface (GUI) configured to allow a user to select between the training mode and the production mode for a target equipment manufacturing process;
causing the display to display the GUI;
supporting an interaction between the GUI and the user; and
providing access, through the GUI from either the training mode or production mode, to a set of instructional training materials for the target equipment manufacturing process.

20. A non-transitory computer-readable medium comprising instructions that, when executed by a processor, cause the processor to control an apparatus, the apparatus having a training mode and a production mode, the apparatus comprising:
a display for supporting a Virtual Reality (VR) environment in the training mode and an Augmented Reality (AR) environment in the production mode; and
a processor for selectively implementing the VR environment in the training mode and the AR environment in the production mode;
the instructions, when executed, causing the apparatus to perform:
generating a graphical user interface (GUI) configured to allow a user to select between the training mode and the production mode for a target equipment manufacturing process;
causing the display to display the GUI;
supporting an interaction between the GUI and the user; and
providing access, through the GUI from either the training mode or production mode, to a set of instructional training materials for the target equipment manufacturing process.

* * * * *